US012592424B2

(12) United States Patent
Kim et al.

(10) Patent No.: US 12,592,424 B2
(45) Date of Patent: Mar. 31, 2026

(54) BATTERY MODULE AND BATTERY PACK INCLUDING THE SAME

(71) Applicant: LG Energy Solution, Ltd., Seoul (KR)

(72) Inventors: Min Seop Kim, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 642 days.

(21) Appl. No.: 17/799,236

(22) PCT Filed: Mar. 9, 2021

(86) PCT No.: PCT/KR2021/002900
§ 371 (c)(1),
(2) Date: Aug. 11, 2022

(87) PCT Pub. No.: WO2021/215654
PCT Pub. Date: Oct. 28, 2021

(65) Prior Publication Data
US 2023/0073470 A1     Mar. 9, 2023

(30) Foreign Application Priority Data

Apr. 22, 2020     (KR) ........................ 10-2020-0048915

(51) Int. Cl.
*H01M 10/613*          (2014.01)
*H01M 10/653*          (2014.01)
(Continued)

(52) U.S. Cl.
CPC ....... *H01M 10/613* (2015.04); *H01M 10/653* (2015.04); *H01M 10/6551* (2015.04); *H01M 10/6557* (2015.04); *H01M 10/6567* (2015.04)

(58) Field of Classification Search
CPC ............. H01M 10/613; H01M 10/647; H01M 10/653; H01M 10/6551; H01M 10/6556;
(Continued)

(56) References Cited

U.S. PATENT DOCUMENTS

| | | |
|---|---|---|
| 2011/0052960 A1 | 3/2011 | Kwon et al. |
| 2012/0313559 A1 | 12/2012 | Tonomura et al. |

(Continued)

FOREIGN PATENT DOCUMENTS

| | | |
|---|---|---|
| CN | 107078365 A | 8/2017 |
| CN | 207265190 U | 4/2018 |

(Continued)

OTHER PUBLICATIONS

Machine translation KR20160065637A (Year: 2016).*

*Primary Examiner* — Victoria H Lynch
(74) *Attorney, Agent, or Firm* — Bryan Cave Leighton Paisner LLP

(57) ABSTRACT

A battery module including: a battery cell stack including a plurality of battery cells; a housing for housing the battery cell stack; and a heat sink located below a bottom part of the housing. The bottom part constitutes an upper plate of the heat sink, the heat sink and the bottom part form a flow passage for a refrigerant, and a convex pattern portion protruding in a direction in which the battery cell stack is located is formed on the bottom part.

7 Claims, 7 Drawing Sheets

(51) Int. Cl.
    *H01M 10/6551*    (2014.01)
    *H01M 10/6557*    (2014.01)
    *H01M 10/6567*    (2014.01)

(58) Field of Classification Search
    CPC ......... H01M 10/6557; H01M 10/6567; H01M
             50/211; Y02E 60/10
    See application file for complete search history.

(56)         References Cited

U.S. PATENT DOCUMENTS

| | | |
|---|---|---|
| 2015/0236314 A1 | 8/2015 | Lee et al. |
| 2016/0164148 A1 | 6/2016 | Yum et al. |
| 2018/0366794 A1 | 12/2018 | Kim et al. |
| 2019/0131596 A1 | 5/2019 | Yang et al. |
| 2020/0006825 A1 | 1/2020 | Lee et al. |
| 2020/0067155 A1 | 2/2020 | Hwang et al. |
| 2021/0218089 A1 | 7/2021 | Koyama |

FOREIGN PATENT DOCUMENTS

| | | |
|---|---|---|
| CN | 110224204 A | 9/2019 |
| CN | 110661057 A | 1/2020 |
| JP | 2012-256521 A | 12/2012 |
| JP | 2014157756 A | 8/2014 |
| JP | 2019516225 A | 6/2019 |
| KR | 1020140138412 A | 12/2014 |
| KR | 10-2016-0024187 A | 3/2016 |
| KR | 10-2016-0065637 A | 6/2016 |
| KR | 1020170021122 A | 2/2017 |
| KR | 10-2017-0142445 A | 12/2017 |
| KR | 1020180038310 A | 4/2018 |
| KR | 10-2018-0047383 A | 5/2018 |
| KR | 10-2018-0091443 A | 8/2018 |
| KR | 10-2019-0070548 A | 6/2019 |
| KR | 10-2020-0008624 A | 1/2020 |
| KR | 10-2020-0021608 A | 3/2020 |
| WO | 2019230325 A1 | 5/2019 |

* cited by examiner

【FIG. 1】
(Related Art)
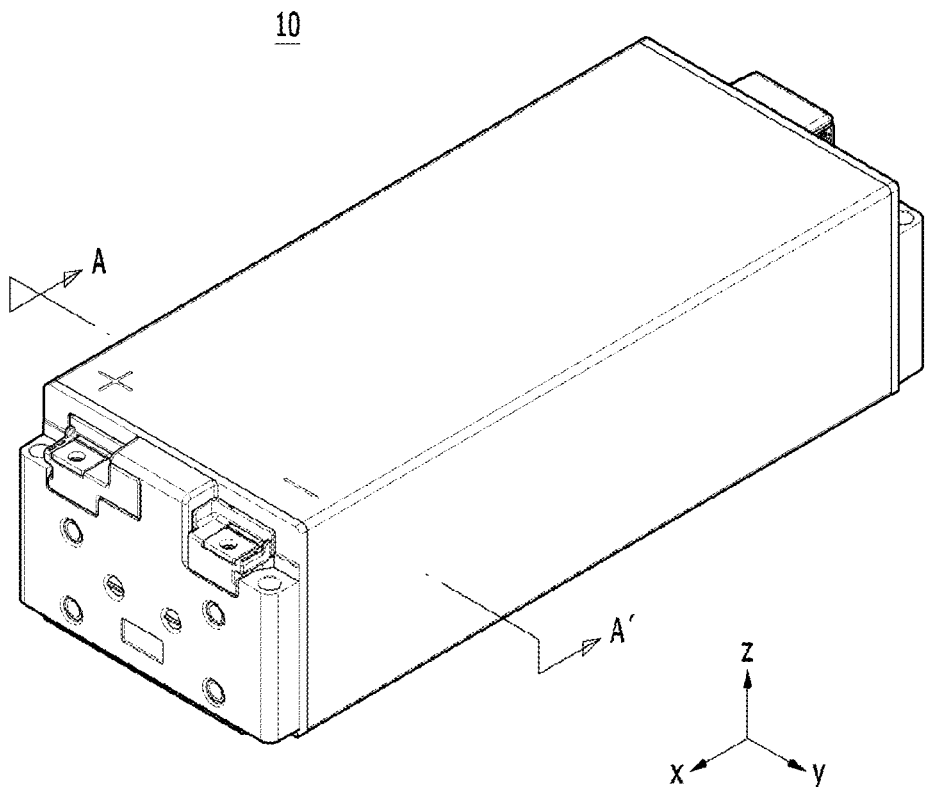

【FIG. 2】
(Related Art)
<u>10</u>
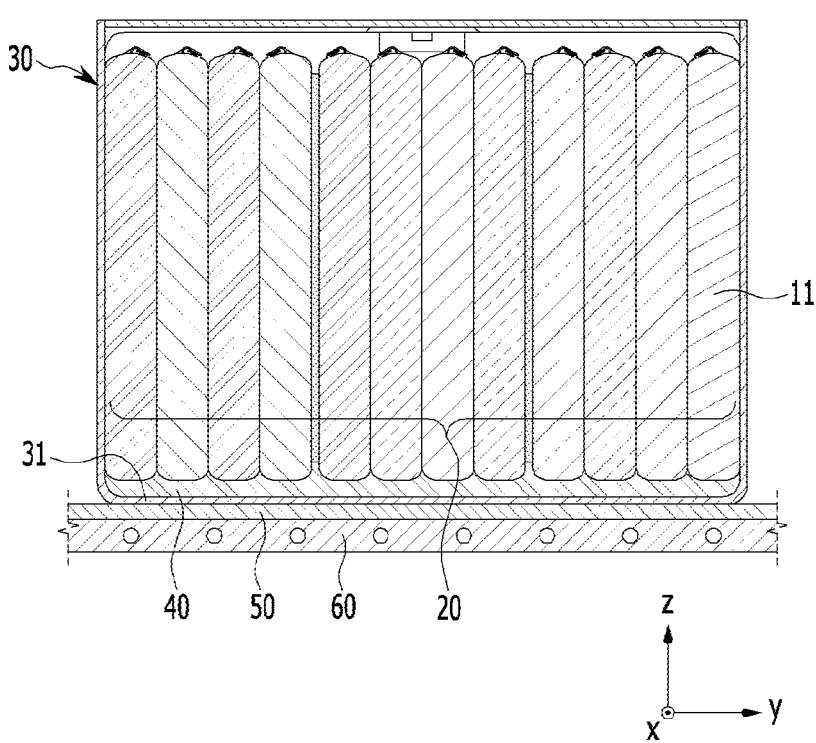

【FIG. 3】
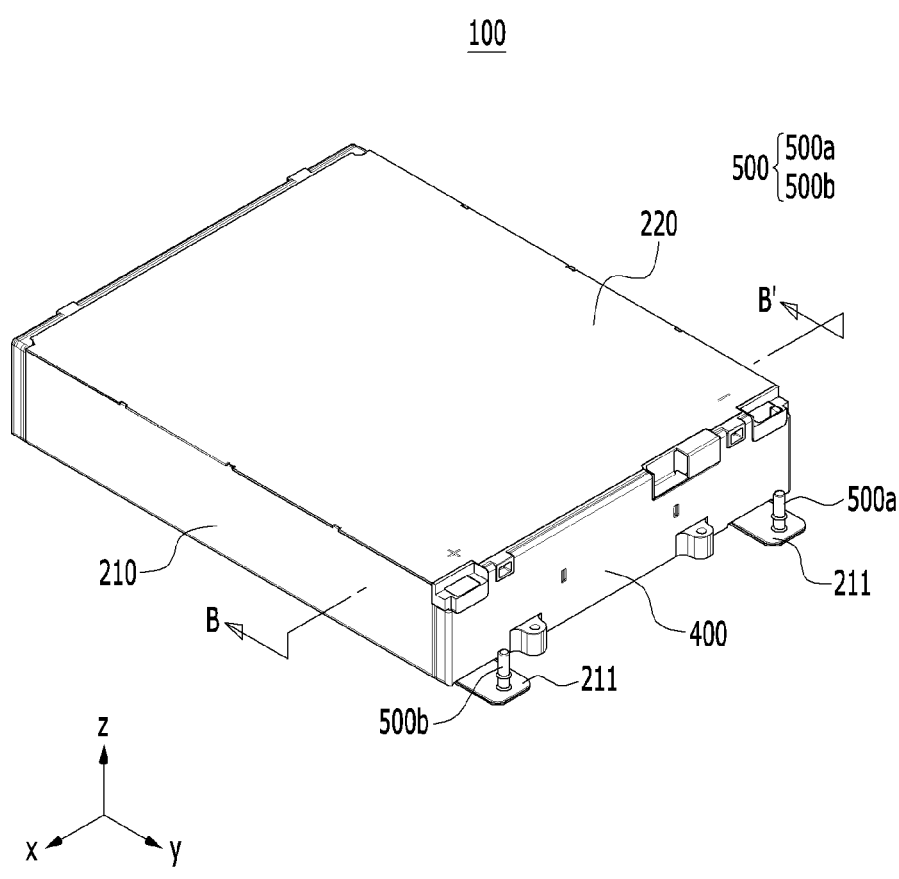

【FIG. 4】
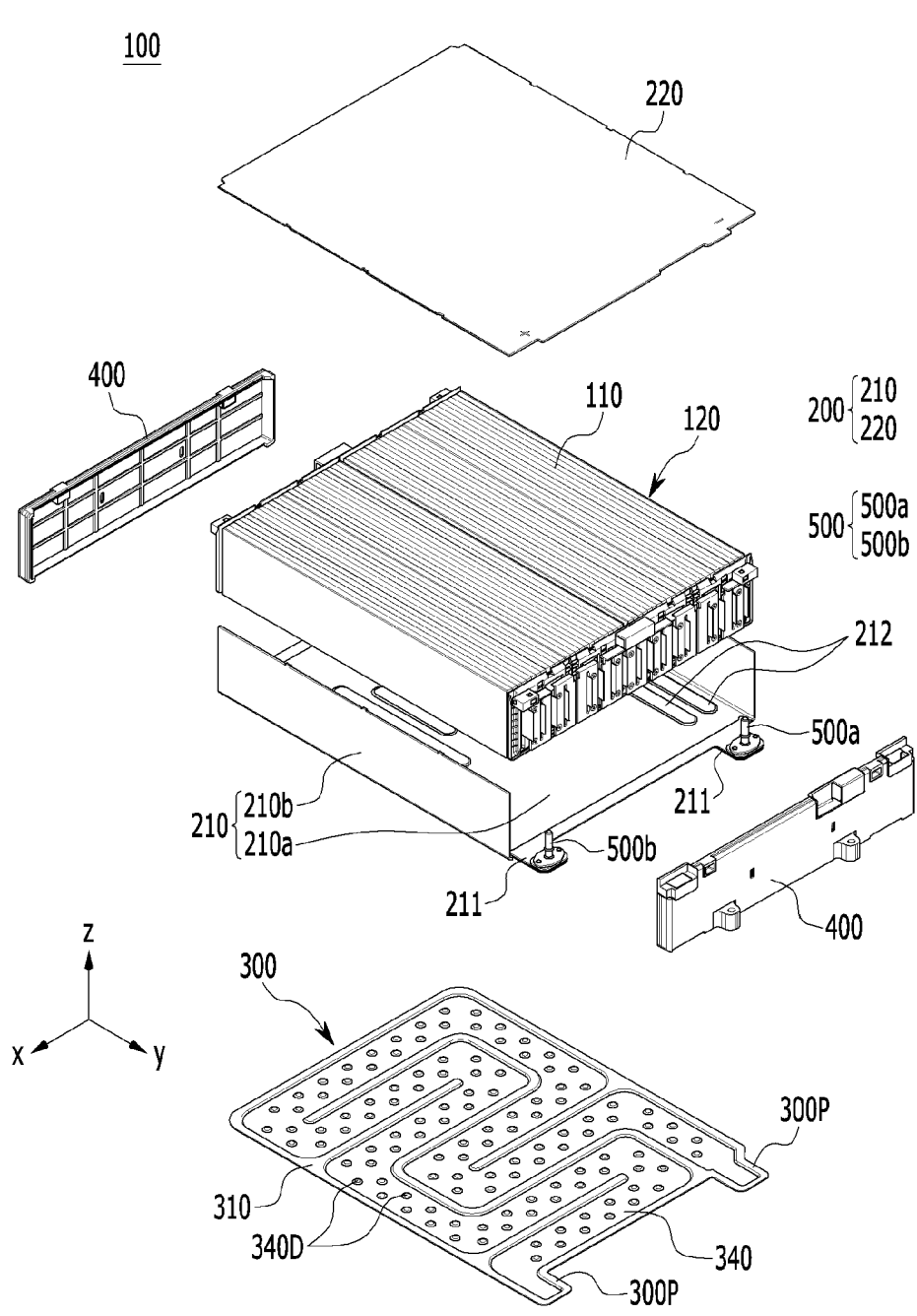

【FIG. 5】
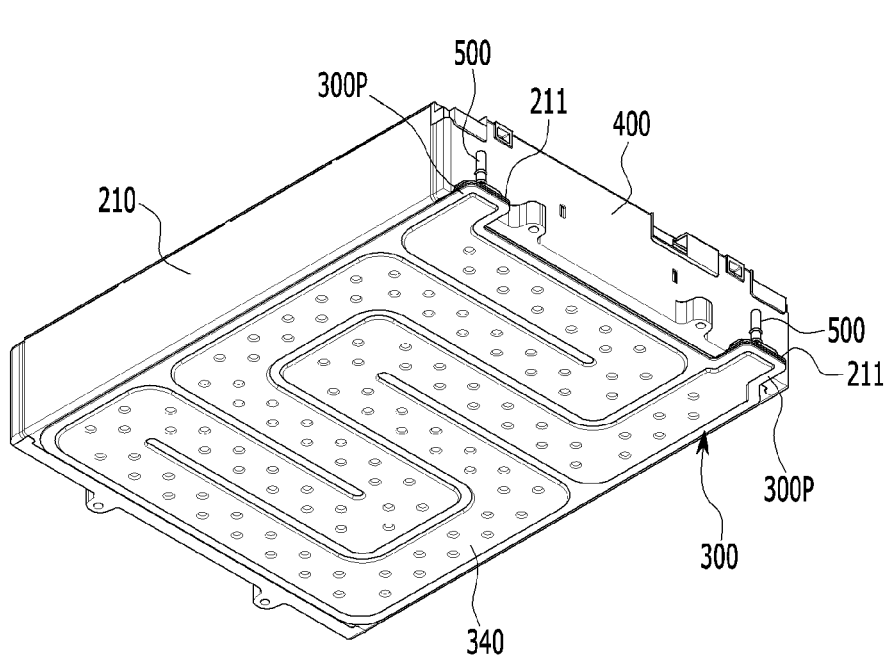

【FIG. 6】
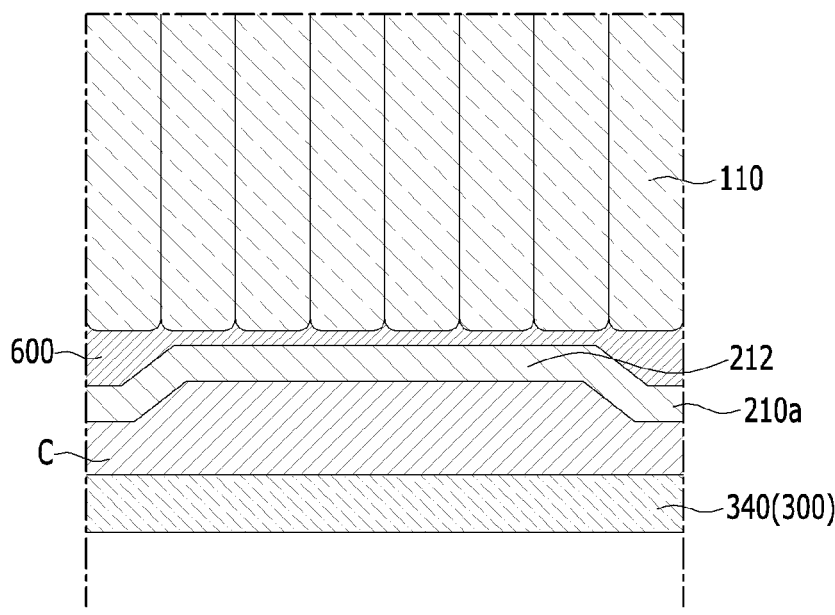
【FIG. 7】
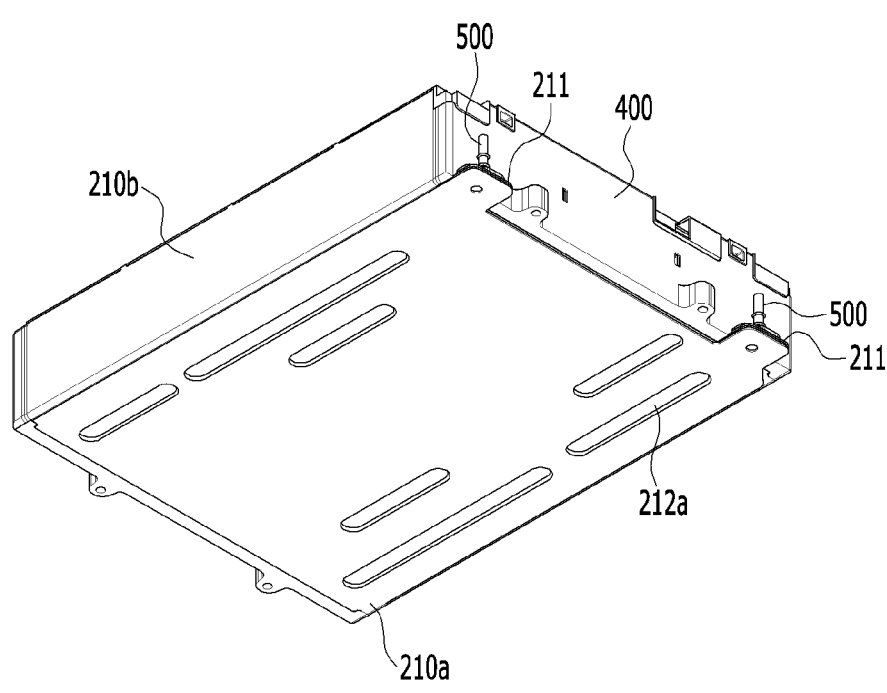

【FIG. 8】
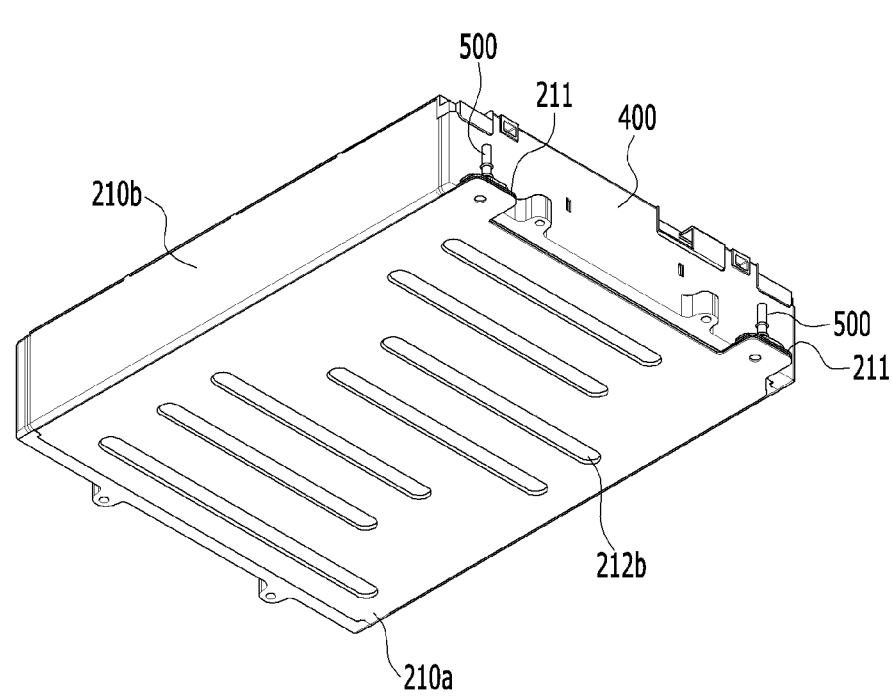

BATTERY MODULE AND BATTERY PACK INCLUDING THE SAME

CROSS-REFERENCE TO RELATED APPLICATIONS

This application is a US national phase of international application No. PCT/KR2021/002900 filed on Mar. 9, 2021, and claims the benefit of Korean Patent Application No. 10-2020-0048915 filed on Apr. 22, 2020, the disclosures of which are incorporated herein by reference in their entirety.

TECHNICAL FIELD

The present disclosure relates to a battery module and a battery pack including the same, and more particularly, to a battery module having improved cooling performance, and a battery pack including the same.

BACKGROUND ART

In modern society, as portable devices such as a mobile phone, a notebook computer, a camcorder and a digital camera are used daily, there has been active development of technologies in the fields related to mobile devices as described above. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles that use fossil fuel. Therefore, there is a growing need for the development of the secondary battery.

Currently commercialized secondary batteries include a nickel cadmium battery, a nickel hydrogen battery, a nickel zinc battery, a lithium secondary battery, and the like. Among them, the lithium secondary battery has been in the spotlight because they have advantages, for example, exhibiting less memory effects compared to nickel-based secondary batteries and thus being freely charged and discharged, and having very low self-discharge rate and high energy density.

Such a lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate coated with the positive electrode active material and the negative electrode active material, respectively, are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch made of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

When the temperature of the secondary battery rises higher than an appropriate temperature, the performance of the secondary battery may deteriorate, and in the worst case, there is also a risk of an explosion or ignition. In particular, a large number of secondary batteries, that is, a battery module or a battery pack having battery cells, can accumulate the heat generated from the large number of battery cells in a narrow space, so that the temperature can rise more quickly and severely. In other words, a battery module in which a large number of battery cells are stacked, and a battery pack equipped with such a battery module, can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a middle or large-sized battery module contained in a vehicle battery pack, it is frequently exposed to direct sunlight and can be subjected to high-temperature conditions such as during the summer or in desert areas.

Therefore, when a battery module or a battery pack is configured, it may be very important to stably and effectively ensure the cooling performance.

FIG. 1 is a perspective view of a conventional battery module. FIG. 2 is a cross-sectional view along the line A-A' of FIG. 1. In particular, FIG. 2 additionally shows a heat transfer member and a heat sink located under the battery module.

As illustrated in FIGS. 1 and 2, the conventional battery module 10 is configured such that a plurality of battery cells 11 are stacked to form a battery cell stack 20, and the battery cell stack 20 is housed in the housing 30.

As described above, since the battery module 10 includes a plurality of battery cells 11, it generates a large amount of heat during charging and discharging processes. As a cooling means, the battery module 10 may include a thermal conductive resin layer 40 that is located between the battery cell stack 20 and the bottom part 31 of the housing 30. In addition, when the battery module 10 is mounted on the frame to form a battery pack, a heat transfer member 50 and a heat sink 60 may be sequentially located under the battery module 10. The heat transfer member 50 may be a heat dissipation pad, and the heat sink 60 may have a refrigerant flow passage formed therein.

The heat generated from the battery cell 11 passes through the thermal conductive resin layer 40, the bottom part 31 of the housing 30, the heat transfer member 50, and the heat sink 60 in this order, and then is transmitted to the outside.

In a conventional battery module 10, the heat transfer path is complicated as described above and thus, it is difficult to effectively transfer the heat generated from the battery cell 11. The housing 30 itself may deteriorate heat transfer properties, and a fine air layer such as an air gap, which can be formed in the space between the housing 30, the heat transfer member 50, and the heat sink 60, respectively, may also be a factor that deteriorates the heat transfer properties.

As for the battery module, since other demands such as downsizing of module and an increase in capacity are also continuing, it can be said that it is practically necessary to develop a battery module capable of satisfying these various requirements while improving the cooling performance.

SUMMARY

An objective of the present disclosure is to provide a battery module having improved cooling performance, and a battery pack including the same.

However, the technical problem to be solved by embodiments of the present disclosure is not limited to the above-described problems, and can be variously expanded within the scope of the technical idea included in the present disclosure.

According to an exemplary embodiment of the present disclosure, there is provided a battery module comprising: a battery cell stack in which a plurality of battery cells are stacked; a housing for housing the battery cell stack; and a heat sink located below a bottom part of the housing, wherein the bottom part constitutes an upper plate of the heat sink, wherein the heat sink and the bottom part form a flow passage of a refrigerant, and wherein a convex pattern portion protruding in a direction in which the battery cell stack is located is formed on the bottom part.

The bottom part may come in contact with the refrigerant.

The convex pattern portion may be located close to the battery cell stack and located away from the heat sink, as compared with a region where the convex pattern portion is not formed among the bottom part.

The battery module may further include a thermal conductive resin layer located between the bottom part of the housing and the heat sink, wherein the thickness of the thermal conductive resin layer corresponding to the convex pattern portion may be smaller than the thickness of the thermal conductive resin layer corresponding to the region where the convex pattern portion is not formed.

At least a part of the convex pattern portion may have a shape extending along one direction.

At least a part of the convex pattern portion may have a shape extending along a direction perpendicular to the stacking direction of the battery cells.

At least a part of the convex pattern portion may have a shape extending along a direction parallel to the stacking direction of the battery cells.

The heat sink may include a lower plate that is joined to the bottom part, and a recessed portion that is formed to be recessed on the lower side of the lower plate.

The flow passage of a refrigerant may be formed between the recessed portion and the bottom part.

The convex pattern portion may be positioned to correspond to the recessed portion when viewed from a direction perpendicular to a surface of the bottom part.

A protrusion pattern protruding toward the bottom part may be formed in the recessed portion.

The housing may include a housing protrusion portion protruding from a part of the bottom part, and the heat sink may include a heat sink protrusion portion protruding from one side of the heat sink to a portion where the housing protrusion portion is located.

The housing protrusion portion may include a first housing protrusion portion and a second housing protrusion portion that are located to be spaced apart from each other at one side of the housing, and a refrigerant injection port may be disposed on the first housing protrusion portion, and a refrigerant discharge port may be disposed on the second housing protrusion portion.

According to exemplary embodiments of the present disclosure, the cooling performance can be improved through the battery module structure in which the housing and the heat sink are integrated.

In addition, a pattern structure can be formed at the bottom part of the housing to secure a space for the refrigerant flow passage and to reinforce the rigidity of the housing.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is a cross-sectional view along line A-A' of FIG. 1;

FIG. 3 is a perspective view of a battery module according to exemplary embodiments of the present disclosure;

FIG. 4 is an exploded perspective view of the battery module of FIG. 3;

FIG. 5 is a perspective view of the battery module of FIG. 3 when viewed in a z-axis direction from bottom to top of the battery module;

FIG. 6 is a partial cross-sectional view along line B-B' of FIG. 3; and

FIGS. 7 and 8 are perspective view of the battery module according to modified embodiments of the present disclosure when viewed in a z-axis direction from bottom to top, showing an arrangement where the heat sink has been removed.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 3 is a perspective view showing a battery module according to exemplary embodiments of the present disclosure. FIG. 4 is an exploded perspective view of the battery module of FIG. 3. FIG. 5 is a perspective view of the battery module of FIG. 3 as viewed in a z-axis direction from bottom to top of the battery module.

As illustrated in FIGS. 3 and 4, a battery module 100 according to exemplary embodiments of the present disclosure includes a battery cell stack 120 in which a plurality of battery cells 110 are stacked, a housing 200 for housing the battery cell stack 120, and a heat sink 300 positioned below the bottom part 210*a* of the housing 200. The bottom part 210*a* of the housing 200 forms an upper plate of the heat sink 300, and the heat sink 300 and the bottom part 210*a* form a flow passage of a refrigerant. A convex pattern portion 212 protruding in the direction in which the battery cell stack 120 is located is formed on the bottom part 210*a*.

The battery cells 110 may be a pouch-type battery cell. The pouch-type battery cell may be formed by housing an electrode assembly in a pouch case of a laminate sheet including a resin layer and a metal layer, and then heat-sealing a sealing part of the pouch case. The battery cells 110 may be formed in a rectangular sheet-like structure.

The battery cells 110 may be composed of a plurality of cells, and the plurality of battery cells 110 are stacked to be electrically connected to each other, thereby forming a battery cell stack 120. In particular, as shown in FIG. 4, a plurality of battery cells 110 may be stacked along a direction parallel to the x-axis.

The housing 200 for housing the battery cell stack 120 may include an upper cover 220 and a U-shaped frame 210.

The U-shaped frame 210 may include a bottom part 210*a* and two side parts 210*b* extending upward from two ends of the bottom part 210*a*. The bottom part 210*a* may cover the lower surface of the battery cell stack 120, and the side parts 210*b* may cover two side surfaces of the battery cell stack 120.

The upper cover 220 may be formed a single plate-shaped structure with a U-shaped frame 210 to cover the lower surface and the upper surface (z-axis direction) and excluding two side surfaces. The upper cover 220 and the U-shaped frame 210 can be joined by welding or the like in a state in which the corresponding corner portions are in contact with each other, thereby forming a structure that covers the battery cell stack 120 vertically and horizontally. The battery cell stack 120 can be physically protected through the upper cover 220 and the U-shaped frame 210. For this purpose, the upper cover 220 and the U-shaped frame 210 may include a metal material having a predetermined strength.

Meanwhile, although not specifically shown, the housing 200 according to modified embodiments of the present disclosure may be a mono frame in the form of a metal plate in which the upper surface, the lower surface, and two sides are integrated. That is, this is not a structure in which the U-shaped frame 210 and the upper cover 220 are joined with each other, but a structure in which the upper surface, the lower surface, and both sides are integrated by being manufactured by extrusion molding.

The end plate 400 may be located on both open sides (y-axis direction) of the housing 200 corresponding to each other, so that it may be formed to cover the battery cell stack 120. The end plate 400 can physically protect the battery cell stack 120 and other electronic instruments from external impact.

Meanwhile, although not specifically shown, a busbar frame on which a busbar is mounted and an insulating cover for electrical insulation may be located between the battery cell stack 120 and the end plate 400.

The housing 200 according to embodiments of the disclosure includes a housing protrusion portion 211 formed so that the bottom part 210*a* of the housing 200 is extended and passes through the end plate 400. At this time, the refrigerant inflowing into and discharged by the cooling port 500 connected to the upper surface of the housing protrusion portion 211 may be supplied to the heat sink 300 via the housing protrusion portion 211 and discharged from the heat sink 300.

Specifically, the cooling port 500 according to exemplary embodiments of the disclosure includes a refrigerant injection port 500*a* and a refrigerant discharge port 500*b*, and the refrigerant injection port 500*a* and the refrigerant discharge port 500*b* may be connected to a pack refrigerant supply tube (not shown) and a pack refrigerant discharge tube (not shown), respectively. The housing protrusion portion 211 includes a first housing protrusion portion and a second housing protrusion portion extending from one side of the housing 200, the refrigerant injection port 500*a* may be disposed on the first housing protrusion portion, and the refrigerant discharge port 500*b* may be disposed on the second housing protrusion portion.

Hereinafter, the heat sink according to exemplary embodiments of the present disclosure will be described in detail with reference to FIGS. 4 and 5.

As illustrated in FIGS. 4 and 5, the bottom part 210*a* of the housing 200 serves as an upper plate of the heat sink 300, and a recessed portion 340 of the heat sink 300 and the bottom part 210*a* of the housing 200 form a flow passage for refrigerant.

Specifically, a heat sink 300 may be formed at under the housing 200, and the heat sink 300 may include a lower plate 310 that forms a skeleton of the heat sink 300 and is joined with the bottom part 210*a* of the housing 200, and a recessed part 340, which is a path through which the refrigerant flows. Further, the heat sink 300 may include a heat sink protrusion portion 300P protruding from one side of the heat sink 300 to the portion where the housing protrusion portion 211 is located.

The heat sink protrusion portion 300P and the housing protrusion portion 211 can be directly coupled by a method such as welding.

The recessed portion 340 of the heat sink 300 corresponds to a portion in which the lower plate 310 is formed to be recessed on the lower side. The recessed portion 340 may have a U-shaped tube in which a cross section cut perpendicularly to the xz plane with respect to the direction in which the refrigerant flow passage extends has a U-shape, and the bottom part 210*a* may be located on the open upper side of the U-shaped tube. The space between the recessed portion 340 and the bottom part 210*a* forms a region through which the refrigerant flows, that is, a refrigerant flow passage, when the heat sink 300 comes into contact with the bottom part 210*a*. Thereby, the bottom part 210*a* of the housing 200 can come into contact with the refrigerant.

The method of manufacturing the recessed portion 340 of the heat sink 300 is not particularly limited, but a U-shaped recessed portion 340 with an open upper side can be formed by providing a structure formed by being recessed with respect to a plate-shaped heat sink 300.

The recessed portion 340 may be connected from one of the heat sink protrusion portions 300P to the other. The refrigerant supplied through a pack refrigerant supply pipe (not shown) and a refrigerant injection port 500a passes between the first housing protrusion portion and the heat sink protrusion portion 300P, and is first flown in the space between the recessed portion 340 and the bottom part 210a. Thereafter, the refrigerant moves along the recessed portion 340, passes between the second housing protrusion portion and the heat sink protrusion portion 300P, and is discharged through a refrigerant discharge port 500b and a pack refrigerant discharge tube (not shown).

As illustrated in FIG. 6, a thermal conductive resin layer 600 containing a thermal conductive resin may be located between the bottom part 210a of the housing 200 and the battery cell stack 120. The thermal conductive resin layer 600 may be formed by applying a thermal conductive resin to the bottom part 210a, and curing the applied thermal conductive resin.

The thermal conductive resin may include a thermal conductive adhesive material, and specifically, may include at least one of silicone material, urethan material, and acrylic material. The thermal conductive resin is a liquid during application but is cured after application so that it can fix one or more battery cells 110 of the battery cell stack 120. Further, since the thermal conductive resin has excellent heat transfer properties, heat generated from the one or more battery cells 110 can be quickly transferred to the lower side of the battery module.

The conventional battery module 10 shown in FIG. 2 is configured such that the heat generated from battery cells 11 passes through a thermal conductive resin layer 40, a bottom part 31 of the housing 30, a heat transfer member 50, and a refrigerant of a heat sink 60 in this order, and then is transferred to the outside of the battery module 10. In addition, the flow passage of the refrigerant of the heat sink 60 is located inside the heat sink 60.

On the other hand, the battery module 100 according to exemplary embodiments of the present disclosure can achieve an integrated type cooling structure of the housing 200 and the heat sink 300 to further improve cooling performance. The bottom part 210a of the housing 200 can act as the upper plate of the heat sink 300, thereby realizing the integrated type cooling structure. The cooling efficiency due to direct cooling can be increased, and the space utilization rate on the battery module and the battery pack equipped with the battery module can be further improved through a structure in which the heat sink 300 is integrated with the bottom part 210a of the housing 200.

Specifically, the heat generated from the battery cells 110 can pass through a thermal conductive resin layer 600 located between the battery cell stack 120 and the bottom part 210a, the bottom part 210a of the housing 200, and the refrigerant, and then can be transferred to the outside of the battery module 100. By removing the unnecessary cooling structure of a conventional setup, the heat transfer passage can be simplified and an air gap between respective layers can be reduced, so that the cooling efficiency or performance can be enhanced. In particular, since the bottom part 210a acts as an upper plate of the heat sink 300 and the bottom part 210a comes into contact with the refrigerant, there is an advantage that more direct cooling through the refrigerant can be performed. This can be distinguished from a conventional device shown in FIG. 2, the upper configuration of the heat transfer member 50 and the heat sink 60 are located between the bottom part 31 and the refrigerant, which causes a reduction in the cooling efficiency.

Further, through the removal of the unnecessary cooling structure, the height of the battery module 100 is reduced and thus, the cost can be reduced and space utilization rate can be increased. Furthermore, since the battery module 100 can be disposed in a compact manner, the capacity or output of the battery pack 1000 including a plurality of battery modules 100 can be increased.

Meanwhile, the bottom part 210a of the housing 200 can be joined by welding to a portion of the lower plate 310 in which the recessed portion 340 is not formed. In exemplary embodiments of the present disclosure, not only can the cooling performance be improved as described above, but the integrated type cooling structure of the bottom part 210a of the housing 200 and the heat sink 300 can also support the load of the battery cell stack 120 housed in the housing 200 and reinforce the rigidity of the battery module 100. In addition, the lower plate 310 and the bottom part 210a of the housing 200 are sealed by welding or the like, so that the refrigerant can flow without leakage in the recessed portion 340 formed inside the lower plate 310.

For effective cooling, as illustrated in FIG. 5, the recessed portion 340 is preferably formed over the entire region corresponding to the bottom part 210a of the housing 200. For this purpose, the recessed portion 340 can be curved at least once to connect from one side to another side. In particular, the recessed portion 340 is preferably curved several times so that the recessed portion 340 is formed over the entire region corresponding to the bottom part 210a of the housing 200. As the refrigerant moves from the starting point to the end point of the refrigerant flow passage formed over the entire region corresponding to the bottom part 210a of the housing 200, efficient cooling can be performed over the entire region of the battery cell stack 120.

The refrigerant is a medium for cooling and is not particularly limited, but it may be a cooling water.

Hereinafter, the convex pattern portion 212 according to exemplary embodiments of the present disclosure will be described in detail with reference to FIGS. 4 to 6.

FIG. 6 is a partial cross-sectional view along line B-B' of FIG. 3. In particular, the convex pattern portion 212 formed on the bottom part 210a is illustrated with emphasis.

As illustrated in FIGS. 4 to 6, as described above, the convex pattern portion 212 protruding in the direction in which the battery cell stack 120 is located is formed on the bottom part 210a of the housing 200 according to exemplary embodiments of the present disclosure. The convex pattern portion 212 corresponds to a portion formed so that a part of the bottom part 210a protrudes upward. In other words, the recessed portion 340 of the heat sink 300 may be formed to be recessed downward, whereas the convex pattern portion 212 may be formed to protrude in the opposite direction.

Therefore, the convex pattern portion 212 may be formed closer to the battery cell stack 120 and away from the heat sink 300, as compared to a region of the bottom part 210a in which the convex pattern portion 212 is not formed. In particular, the convex pattern portion 212 may be formed at a position corresponding to the recessed portion 340 of the heat sink 300. By providing the convex pattern portion 212, the distance between the convex pattern portion 212 and the recessed portion 340 can be formed relatively further apart than that of the other bottom part 210a. Through this, the flow rate of the refrigerant C between the convex pattern portion 212 and the recessed portion 340 can be increased. Since the flow rate of the refrigerant C flowing along the recessed portion 340 can be increased, the cooling performance of the battery module 100 can be further improved.

In addition, since the bottom part 210a on which the convex pattern portion 212 is formed forms a kind of bead structure, it can reinforce the rigidity of the lower portion of the battery module 100.

Further, as described above, the thermal conductive resin layer 600 is located between the bottom part 210a of the housing 200 and the battery cell stack 120, wherein as the convex pattern portion 212 is formed, the required amount of the thermal conductive resin for forming the thermal conductive resin layer 600 can be reduced, and thus the cost may be reduced.

Hereinafter, the directions of the convex pattern portions 212a and 212b according to modified embodiments of the present disclosure will be described in detail with reference to FIGS. 7 and 8.

FIGS. 7 and 8 are modified embodiments of the present disclosure, and are perspective views of the battery module as viewed in a z-axis direction from bottom to top in which the heat sink has been removed. As the battery module is viewed in from bottom to top, the convex pattern portions 212a and 212b protruding upward appear to have a concave structure.

As illustrated in FIG. 7, together with FIGS. 4 and 5, at least a part of the convex pattern portion 212a according to embodiments of the present disclosure may have a shape extending along one direction. More specifically, at least a part of the convex pattern portion 212a may have a shape extending along a direction perpendicular to the stacking direction (direction parallel to the x-axis) of the battery cells 110.

Next, as illustrated in FIG. 8, together with FIGS. 4 and 5, at least a part of the convex pattern portion 212b according to another embodiment of the present disclosure may have a shape extending along another direction. More specifically, at least a part of the convex pattern portion 212b may have a shape extending along a direction parallel to the stacking direction (direction parallel to the x-axis) of the battery cells 110.

As described above, the recessed portion 340 of the heat sink 300 can be curved several times to connect from one side to the other. As illustrated in FIGS. 5, 7 and 8, the convex pattern portions 212a and 212b may be positioned to correspond to the recessed portion 340 when viewed from a direction perpendicular to one surface of the bottom part 210a. Further, it may be positioned such the they do not correspond to the lower plate 310.

Specifically, the convex pattern portion 212a in FIG. 7 may be formed to be located at a position that corresponds to the portion extending along a direction perpendicular to the stacking direction of the battery cells 110 among the recessed portions 340 when viewed from a direction perpendicular to one surface of the bottom part 210a. The convex pattern portion 212b in FIG. 8 may be formed to be located at a position corresponding to a portion of the recessed portion 340 extending along a direction parallel to the stacking direction of the battery cells 110 when viewed from a direction perpendicular to one surface of the bottom part 210a. As described above, the lower plate 310 of the heat sink 300 and the bottom part 210a of the housing 200 may be joined by welding. As the convex pattern portions 212a and 212b are located at positions corresponding to the recessed portion 340 when viewed from a direction perpendicular to one surface of the bottom part 210a, it is possible to secure a welding region between the lower plate 310 and the bottom part 210a while increasing the flow rate of the refrigerant C. That is, as the convex pattern portions 212a and 212b are designed to avoid the region of the lower plate 310, welding of the lower plate 310 and the bottom part 210a may be performed smoothly.

Meanwhile, as illustrated in FIG. 4, a protrusion pattern 340D may be formed in the recessed portion 340 of the heat sink 300 according to exemplary embodiments of the present disclosure. In the case of a large-area battery module in which the number of stacked battery cells is increased significantly compared to a conventional case, as in the battery cell stack 120 according to exemplary embodiments of the present disclosure, the width of the refrigerant flow passage may be wider and thus, a temperature deviation can be more severe. The large-area battery module may include a case in which approximately 32 to 48 battery cells are stacked in one battery module compared to a conventional case in which approximately 12 to 24 battery cells are stacked in one battery module. In such a case, the pressure drop can be minimized, and at the same time, the temperature deviation between the widths of the refrigerant flow passage can be reduced because the protrusion pattern 340D according to exemplary embodiments of the present disclosure can substantially reduce the width of the refrigerant flow passage. Therefore, a uniform cooling effect can be realized.

The terms representing directions such as the front side, the rear side, the left side, the right side, the upper side, and the lower side have been used in embodiments of the present disclosure, but the terms used are provided simply for convenience of description and may become different according to the location of an object or an observer.

The one or more battery modules according to exemplary embodiments of the present disclosure described above can be mounted together with various control and protection systems such as a battery management system (BMS) and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

The invention claimed is:

1. A battery module comprising:
a battery cell stack comprising a plurality of battery cells;
a housing comprising the battery cell stack; and
a heat sink located below a bottom part of the housing,
wherein the bottom part forms an upper plate of the heat sink,
wherein the heat sink and the bottom part of the housing form a refrigerant flow passage configured to receive a refrigerant,
wherein the bottom part of the housing comprises a convex pattern portion protruding toward the battery cell stack,
wherein the convex pattern portion of the bottom part of the housing is located closer to the battery cell stack, and further away from the heat sink, than a portion of the bottom part not including the convex pattern portion,
wherein the heat sink comprises a lower plate that is joined to the bottom part of the housing, and a recessed portion on a lower surface of the lower plate, and the refrigerant flow passage is between the recessed portion of the lower plate and the bottom part of the housing, wherein the convex pattern portion of the bottom part of the housing is positioned to correspond to the recessed portion of the lower plate when viewed from a direction perpendicular to a surface of the bottom part, and wherein the portion of the convex pattern portion has a shape extending along a direction perpendicular to a stacking direction of the plurality of battery cells or a direction parallel to a stacking direction of the plurality of battery cells.

2. The battery module of claim 1, wherein:

the bottom part of the housing is configured to be in contact with the refrigerant.

3. The battery module of claim 1, further comprising:

a thermal conductive resin layer located between the bottom part of the housing and the battery cell stack, wherein a thickness of the thermal conductive resin layer corresponding to the convex pattern portion is smaller than a thickness of the thermal conductive resin layer corresponding to the portion of the bottom part not including the convex pattern portion.

4. The battery module of claim 1, further comprising:

a protrusion pattern in the recessed portion of the lower plate, wherein the protrusion pattern protrudes toward the bottom part of the housing.

5. The battery module of claim 1, wherein:

the housing comprises a housing protrusion portion protruding from the bottom part of the housing, and the heat sink comprises a heat sink protrusion portion protruding from one side of the heat sink to a portion of the housing comprising the housing protrusion portion.

6. The battery module of claim 5, wherein:

the housing protrusion portion comprises a first housing protrusion portion and a second housing protrusion portion, wherein the first and second housing protrusion portions are spaced apart from each other at one side of the housing, the first housing protrusion portion comprises a refrigerant injection port, and the second housing protrusion portion comprises a refrigerant discharge port.

7. A battery pack comprising the battery module of claim 1.

* * * * *